Jan. 26, 1965
N. G. HOVLID
3,167,051
AQUARIUM CONSTRUCTION
Filed Aug. 15, 1962
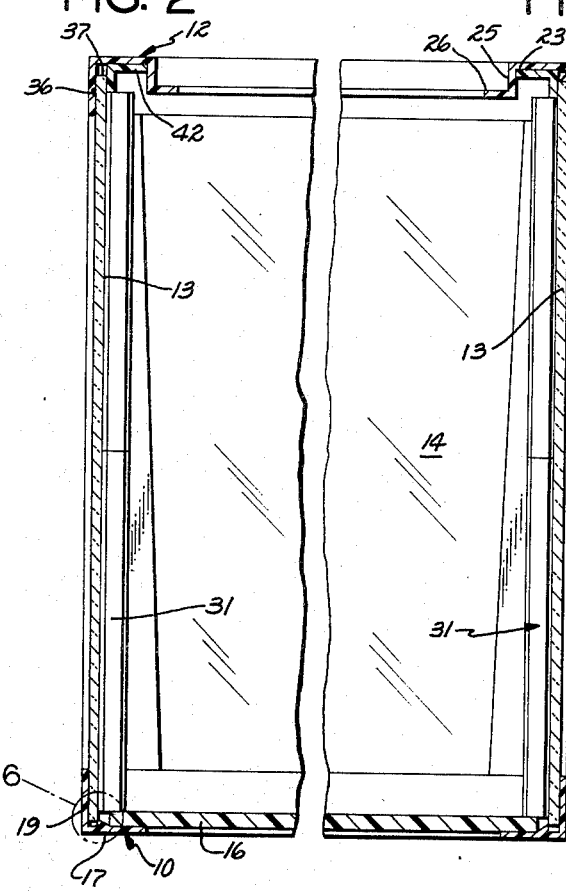
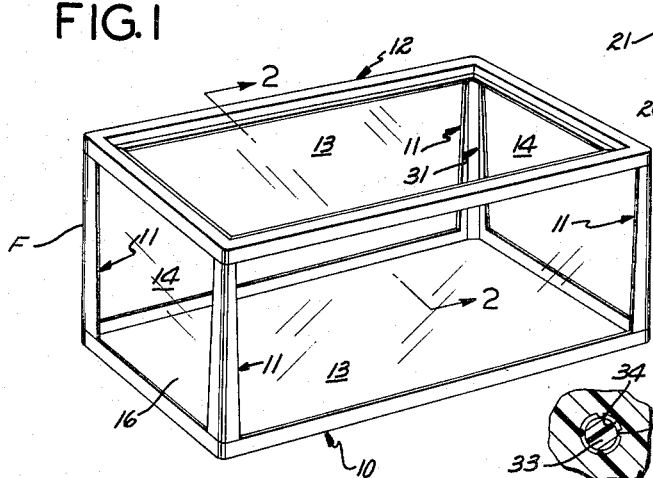
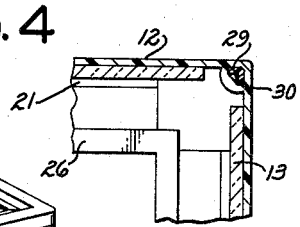
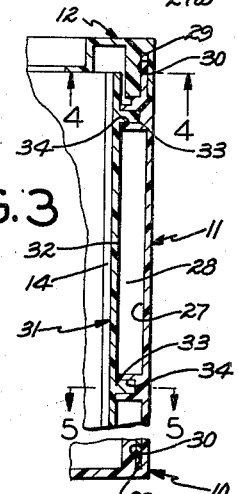
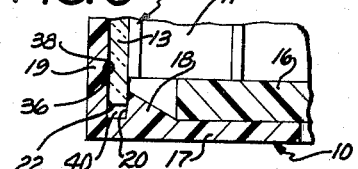
INVENTOR.
NORMAN G. HOVLID
BY FULWIDER, PATTON,
RIEBER, LEE & UTECHT
ATTORNEYS

United States Patent Office 3,167,051
Patented Jan. 26, 1965

3,167,051
AQUARIUM CONSTRUCTION
Norman G. Hovlid, Long Beach, Calif., assignor to Norman G. Hovlid and Mary Z. Hovlid, as joint tenants
Filed Aug. 15, 1962, Ser. No. 217,078
7 Claims. (Cl. 119—5)

This invention relates generally to a new and novel type of aquarium.

It is a major object of the present invention to provide an aquarium which can be shipped and sold in an unassembled condition, and later assembled by retail dealers or the ultimate purchasers.

It is another object of the present invention to provide an aquarium of the aforedescribed nature that can be easily assembled even by non-skilled workers and without the use of tools.

It is a further object of the present invention to provide novel means for effecting a seal between the glass walls of an aquarium and the framework of such aquarium.

It is another object of the present invention to provide a non-corroding aquarium, preferably made of synthetic plastic, the framework of which will have interlocking parts.

An additional object is to provide an aquarium wherein the glass panels may be readily replaced when desired.

Still another object of the invention is to provide an aquarium which has a neat appearance, is economical to manufacture and distribute, and has special appeal for "do-it-yourself" fans and fish lovers.

These and other objects and advantages of the present invention will become apparent from the following detailed description, when taken in conjunction with the appended drawing, wherein:

FIGURE 1 is a perspective view of an assembled aquarium constructed in accordance with the present invention;

FIGURE 2 is a broken, vertical sectional view of said assembled aquarium taken on line 2—2 of FIGURE 1, but in enlarged scale;

FIGURE 3 is a fragmentary, broken vertical sectional view in reduced scale taken on line 3—3 of FIGURE 5;

FIGURE 4 is a fragmentary horizontal sectional view in reduced scale taken on line 4—4 of FIGURE 3;

FIGURE 5 is an enlarged fragmentary horizontal sectional view taken on line 5—5 of FIGURE 3;

FIGURE 6 is an enlarged fragmentary view showing details of construction of the encircled area designated 6 in FIGURE 2; and FIGURE 7 is a fragmentary vertical sectional view taken on line 7—7 of FIGURE 5.

Referring now to the drawings and particularly to FIGURE 1 thereof, an assembled aquarium embodying the present invention includes a generally rectangular plastic framework F having a horizontally extending bottom frame 10, four identical vertical corner posts 11, a horizontally extending top frame 12, glass side walls or panels 13 and glass end walls or panels 14. As shown in detail in FIGURE 2, the bottom frame 10 rigidly supports a bottom 16. Although frame 10 and bottom 16 are shown as separate parts, the two can be formed integrally. Bottom 16 is shown as being of an opaque material, it should be understood, however, that when it is not integral with the frame 10 the bottom can be glass, a clear plastic, or other suitable material. Likewise, one or more of the four glass walls 13 and 14 can be manufactured from a clear plastic or an opaque material, if desired, without departing from the scope of the present invention.

The bottom frame 10 and the top frame 12 are shown as having a rectangular outline, which is the usual shape for this type of object. Referring particularly to FIGURE 6, the bottom frame 10 is of identical vertical cross-section throughout its length and includes a horizontal flange 17 and a vertical flange 19. The horizontal flange 17 serves as a support for the bottom 16. Horizontal flange 17 is formed with an upstanding rib 18 on its upper surface in close proximity to the inner face of vertical flange 19. This rib 18 serves as a support for each of the glass walls 13 and 14.

The outer surface 20 of each rib 18 slopes downwardly and outwardly towards the adjacent inner surface 21 of the vertical flange 19 adjacent thereto. This arrangement affords a snug fit between the lower edges of the glass panes 13 and 14 and the lower frames, regardless of variations in thickness frequently found in glass of the quality used to construct small aquariums.

Referring to FIGURE 2, top frame 12 also is of identical cross-section throughout its length. This frame 12 includes a horizontal flange 23 and an outer vertical flange 24 depending therefrom. An inner vertical flange 25 depends from the inner edge of horizontal flange 23 to serve as a support for horizontal seat flange 26. The latter provides a support when a top cover (not shown) is desired for the aquarium. If a cover is not used elements 25 and 26 may be eliminated.

Referring now to FIGURES 3 and 5, the corner posts 11 have their ends connected to bottom frame 10 and top frame 12. Each corner post 11 is generally V-shaped in horizontal cross-section and is formed along its sides with vertical flanges defining recesses 27 and 28 for receiving the edge portions of the glass walls 13 and 14. The upper and lower ends of corner posts 11 are formed with connecting pins 29 projecting longitudinally outwardly from both the top and bottom ends. These pins 29 serve the purpose of connecting the top frame 12 and the bottom frame 10 to the corner posts 11 when inserted into complementary recesses 30 formed at the corners of the top and bottom frames. Pins 29 and recesses 30 are preferably of such a cross-section as to be relatively non-rotatable for a reason to be set forth hereinafter.

Referring particularly to FIGURES 3, 5 and 7, each corner post 11 is provided with an elongated glass retainer 31 comprising a generally flat body 32 formed with a plurality of projecting pins 33. The pins 33 slidably telescopically fit within complementary sockets 34 formed along the length of each corner post 11. The pins 33 are each tapered, and the sockets 34 are formed with longitudinal ridges 35. Hence, when pins 32 are inserted into sockets 34 a releasable snap-lock connection is effected and accordingly retainers 31 can be removed at any time by disjoining the snap-lock connection between pins 33 and sockets 34. The flat body 32 is provided with end walls 35 generally parallel with the flanges of its respective corner post 11.

When the components of the framework F are to be assembled, the pins 29 are dipped into an aromatic solvent for the plastic. The top and bottom frames 12 and 10, respectively, are then quickly connected to corner posts 11 by means of the aforedescribed connecting pins 29 and complementary recesses 30. The pins 29 are thus bonded to the top and bottom frames and the ends of the corner posts 11 are rigidly affixed to the top and bottom frames in a water-tight manner. It should be particularly noted that the inner surfaces of vertical flanges 27 and 28 of the corner posts 11 define matching plane surfaces with the inner surfaces 21 of the vertical flanges 19 of the bottom frame 10 as well as with the corresponding inner surfaces of the vertical flanges 24 of the top frame 12. The provision of such matching plane surfaces is facilitated by the use of the relatively non-rotatable pins 29 and recesses 30 between the ends of the corner posts 11 and the top and bottom frames. In practice, it has been found that the bond is made most effective by the use of a jig or other mechanical means to exert a compressive pressure on the top and bottom frames. When a jig is not available for this purpose, light weights may be used. Most plastic solvents now on the market require about an hour for drying and bonding. After this amount of time has passed, pressure may be removed.

Glass walls 13 and 14 are installed within the plastic framework F after it has been assembled. In preparation of the installation of the glass walls 13 and 14 a bead of sealant 36 (see FIGURES 5 and 6) is applied to the inner face of vertical flanges 19 and 24 of the bottom and top frames, respectively, and to the outer surfaces of the recesses 27 and 28 of the corner posts 11. Both the vertical flanges 19 and 24 and the outer surfaces of recesses 27 and 28 are preferably formed with longitudinal grooves 38. These grooves 38 will permit a space wherein the bead of sealant 36 may flow so as to be prevented from extruding out from between the glass walls and the framework when holding pressure is applied to the walls. It has been found that a sealant comprising vulcanized butyl rubber latex, substantially broken down and dissolved in a petroleum solvent, will provide a suitable water-tight seal. More specifically, the following formulation has proven satisfactory:

50% vulcanized butyl latex
20% finely ground filler such as clay
30% petroleum solvent
(If desired, 5% aromatic solvent may be substituted for part of the petroleum solvent)

After glass walls 13 and 14 have been installed, the solvent will evaporate leaving the rubber latex. This latter material will retain a slight degree of resiliency and this quality assists in maintaining an effective seal over very long periods of time. When water is placed within the aquarium, water pressure against the glass walls compresses the latex slightly. Thus, the pressure of the water contained within the aquarium will aid in maintaining the effectiveness of the seal between the glass walls and the framework.

It is preferable to install all four glass walls 13 and 14 within the framework at one time. This is best accomplished by inserting one of the side walls 13 within the framework first. This wall should be held in an inclined position as its bottom edge 22 is inserted within the wedge-shaped space 40 defined between surfaces 20 and 21 (see FIGURE 6). When the button frame 10 has been constructed in accordance with the present invention, ribs 18 will be located far enough from vertical flanges 19 so that a bottom edge 22 of the glass walls 13 and 14 never fill the space 40.

The sealant applied to the inner face of flanges 19 can be a bead extending the full length of said flanges. It need not be applied over the total surface area of the inner face, however. It has been found that a bead of sealant approximately one-quarter inch in width will give adequate sealing protection. As the bottom edge 22 of glass wall 13 is inserted into space 40, the glass wall 13 is held in an inclined position so that it will not wipe the bead of sealant, but will pass underneath the bead until it meets the inner surface of flange 19 and inclined surface 20 of rib 18. Next, the top edge of the glass wall can be brought upward vertically against the inner surface of the outer flange 24 of the top frame 12.

The second glass wall to be inserted should be one of the end walls 14. The procedure for doing this is exactly the same as that described above. An additional step is taken after a second glass wall has been installed, but before a third wall is installed. This step consists of placing one of the glass retainers 31 at the corner of intersection of the two walls which have already been installed. Solvent is not used to bond pins 33 into sockets 34, as is the case with pins 29 into recesses 30, previously described.

After installing an end glass 14, the third wall to be installed should be the other side wall 13 opposite the first wall installed. Next, a second glass retainer 31 is placed between this wall and the previously installed end wall. Then the second end wall 14 is installed. The final steps of assembly consist of inserting the last two glass retainers 31 between the third and fourth installed glass walls, and the fourth and first installed glass walls. If desired, the glass retainer 31 holding the first and last walls can be installed immediately after the first wall is installed. Since the glass retainers are removable, the first wall can be held at both side edges while the second and third walls are installed. The fourth glass retainer would then be removed prior to installing the second end wall and replaced immediately after this wall has been installed.

Preferably, after the glass walls 13 and 14 have been installed within the framework F, a guard 42 will be positioned between the upper inner edge of each glass wall and the underside of the top frame 12, as indicated in FIGURE 2. This guard 42 is of inverted L-shape in vertical cross-section and serves to prevent contact between the upper edges of the glass walls and the fingers of a person cleaning or otherwise handling the completed aquarium.

It should be noted that after the aforedescribed aquarium has been assembled the framework F and the glass walls 13 and 14 will be mutually self-supporting. Hence, a structure of maximum strength for minimum weight is provided. The glass retainers 31 serve initially to retain the glass walls in position while the sealant 36 cures. If it becomes desirable to replace the glass walls these retainers may be readily removed for this purpose. It is a major advantage of the aforedescribed aquarium that the framework F may be assembled at a manufacturing plant and shipped in a knocked-down condition to a remote location. At this location the framework may be assembled and the glass panels mounted therein. The glass panels may be produced at or near the remote location thereby affording an important savings in freight and packaging. The aquarium may be assembled either by a dealer or franchise assembler in the remote location or alternatively by the ultimate user. The provision of the matching plane surfaces on the frames 10 and 12 and the corner posts 11 greatly facilitate sealing the glass walls 13 and 14 relative to the framework F. The sealant 36 when cured provides an initial seal and the pressure of the water within the aquarium serves to apply an outwardly directed force of the walls against the sealant. Since this sealant retains resiliency, such force permits it to deform in conformance with any surface irregularities. The cross-section of the sealant exposed to water pressure, however, is so slight compared to the tensional integrity of the sealant and its width that the sealant will not be extruded outwardly relative to the glass walls.

Various modifications and changes may be made with respect to the foregoing description without departing from the spirit of the invention or the scope of the following claims.

I claim:

1. An aquarium, comprising: a top frame having a horizontal flange and a depending vertical flange; a bottom frame having a horizontal flange and an upstanding vertical flange, the upper portion of said last-mentioned horizontal flange being formed with an upstanding rib, the outer surface of which slopes downwardly and outwardly towards the adjacent surface of said last-mentioned vertical flange; a bottom on the horizontal flange of said bottom frame; vertical corner posts interconnecting said top and bottom frames and having vertical flanges aligned with the vertical flanges of said frames to define matching plane surfaces; side and end walls within said frames, the lower edges of each of said walls being disposed within the wedge-shaped space between said sloping surface of one of said ribs and the adjacent surfaces of the vertical flange of said bottom frame; a resilient, initially uncured sealant interposed between the outer edge portions of said side and end walls and the inner surfaces of the vertical flanges of said top and bottom frames and said corner posts; and an elongated retainer removably affixed to each of said corner posts to support said side and end walls against said frames and corner posts as said sealant cure.

2. An aquarium, comprising: a top frame having a horizontal flange and a depending vertical flange; a bottom frame having a horizontal flange and an upstanding vertical flange, the upper portion of said last-mentioned horizontal flange being formed with an upstanding rib, the outer surface of which slopes downwardly and outwardly towards the adjacent inner surface of said last-mentioned vertical flange; a bottom on the horizontal flange of said bottom frame; vertical corner posts interconnecting said top and bottom frames and having vertical flanges aligned with the vertical flanges of said frames to define matching plane surfaces, and the inner surfaces of each of said flanges being formed with a longitudinal groove; side and end walls within said frames, the lower edges of each of said walls being disposed within the wedge-shaped space between said sloping surface of one of said ribs and the adjacent inner surfaces of the vertical flange of said bottom frame; a resilient, initially uncured sealant interposed between the outer edge portions of said side and end walls and the inner surfaces of the vertical flanges of said top and bottom frames and said corner posts, a quantity of said sealant being disposed within each of said grooves; and an elongated retainer removably affixed to each of said corner posts to support said side and end walls against said frames and corner posts as said sealant cures.

3. An aquarium, comprising: a top frame having a horizontal flange and a depending vertical flange; a bottom frame having a horizontal flange and an upstanding vertical flange, the upper portion of said last-mentioned horizontal flange being formed with an upstanding rib, the outer surface of which slopes downwardly and outwardly towards the adjacent surface of said last-mentioned vertical flange; a bottom on the horizontal flange of said bottom frame; vertical corner posts interconnecting said top and bottom frames and having vertical flanges aligned with the vertical flanges of said frames to define matching plane surfaces, and the inner surfaces of each of said flanges being formed with a longitudinal groove; glass side and end walls within said frames, the lower edges of each of said walls being disposed within the wedge-shaped space between said sloping surface of one of said ribs and the adjacent inner surfaces of the vertical flange of said bottom frame; a resilient sealant interposed between the outer edge portions of said side and end walls and the inner surfaces of the vertical flanges of said top and bottom frames and said corner posts, a quantity of said sealant being disposed within each of said grooves; and an elongated glass retainer removably affixed to each of said corner posts supporting said side and end walls against said frames and corner posts.

4. An aquarium, comprising: a top frame having a horizontal flange and a depending vertical flange; a bottom frame having a horizontal flange and an upstanding vertical flange, the upper portion of said last-mentioned horizontal flange being formed with an upstanding rib, the outer surface of which slopes downwardly and outwardly towards the adjacent surface of said last-mentioned vertical flange; a bottom on the horizontal flange of said bottom frame; vertical corner posts interconnecting said top and bottom frames and having vertical flanges aligned with the vertical flanges of said frames to define matching plane surfaces; side and end walls within said frames, the lower edges of each of said walls being disposed within the wedge-shaped space between said sloping surface of one of said ribs and the adjacent surfaces of the vertical flange of said bottom frame; a resilient, initially uncured sealant interposed between the outer edge portions of said side and end walls and the inner surfaces of the vertical flanges of said top and bottom frames and said corner posts; an elongated retainer for each of said corner posts, each retainer including a generally flat body having end walls generally parallel with the vertical flanges of its respective corner post; and snap lock means interposed between each of said corner posts and the main body of its respective retainer and including telescopically interfitting pins and sockets.

5. An aquarium, comprising: a top frame having a horizontal flange and a depending vertical flange; a bottom frame having a horizontal flange and an upstanding vertical flange, the upper portion of said last-mentioned horizontal flange being formed with an upstanding rib, the outer surface of which slopes downwardly and outwardly towards the adjacent inner surface of said last-mentioned vertical flange; a bottom on the horizontal flange of said bottom frame; vertical corner posts interconnecting said top and bottom frames and having vertical flanges aligned with the vertical flanges of said frames to define matching plane surfaces, and the inner surfaces of each of said flanges being formed with a longitudinal groove; side and end walls within said frames, the lower edges of each of said walls being disposed within the wedge-shaped space between said sloping surface of one of said ribs and the adjacent inner surfaces of the vertical flange of said bottom frame; a resilient, initially uncured sealant interposed between the outer edge portions of said side and end walls and the inner surfaces of the vertical flanges of said top and bottom frames and said corner posts, a quantity of said sealant being disposed within each of said grooves; and elongated retainer for each of said corner posts, each retainer including a generally flat body having end walls generally parallel with the vertical flanges of its respective corner post; and snap lock means interposed between each of said corner posts and the main body of its respective retainer and including telescopically interfitting pins and sockets.

6. An aquarium, comprising: a top frame having a horizontal flange and a depending vertical flange; a bottom frame having a horizontal flange and an upstanding vertical flange, the upper portion of said last-mentioned horizontal flange being formed with an upstanding rib, the outer surface of which slopes downwardly and outwardly towards the adjacent surface of said last-mentioned vertical flange; a bottom on the horizontal flange of said bottom frame; vertical corner posts interconnecting said top and bottom frames and having vertical flanges; complementary telescopically interfitting non-rotatable pins and recesses interposed between the ends of said corner posts and the corners of said top and bottom frames, whereby when said corner posts and frames are assembled the vertical flanges thereof define matching plane surfaces; side and end walls within said frames, the lower edges of each of said walls being disposed within the wedge-shaped space between said sloping surface of one of said ribs and the adjacent surfaces of the vertical flange of said bottom frame; a resilient, initially uncured sealant interposed between the outer edge portions of said side and end walls and the inner surfaces of the vertical flanges of said top and bottom frames and said corner posts; an elongated retainer for each of said corner posts, each retainer including a generally flat body having end walls generally parallel with the vertical flanges of its respective corner post; and snap lock means interposed between each of said croner posts and the main body of its respective retainer and including telescopically interfitting pins and sockets.

7. An aquarium, comprising: a top frame having a horizontal flange and a depending vertical flange; a bottom frame having a horizontal flange and an upstanding vertical flange, the upper portion of said last-mentioned horizontal flange being formed with an upstanding rib, the outer surface of which slopes downwardly and outwardly towards the adjacent inner surface of said last-mentioned vertical flange; a bottom on the horizontal flange of said bottom frame; vertical corner posts interconnecting said top and bottom frames and having vertical flanges; complementary telescopically interfitting non-rotatable pins and recesses interposed between the ends of said corner posts and the corners of said top and bottom frames, whereby when said corner posts and frames are assembled the vertical flanges thereof define matching plane surfaces, and the inner surfaces of each of said flanges being formed with a longitudinal groove; side and end walls within said frames, the lower edges of each of said walls being disposed within the wedge-shaped space between said sloping surface of one of said ribs and the adjacent inner surfaces of the vertical flange of said bottom frame; a resilient, initially uncured sealant interposed between the outer edge portions of said side and end walls and the inner surfaces of the vertical flanges of said top and bottom frames and said corner posts, a quantity of said sealant being disposed within each of said grooves; an elongated retainer for each of said corner posts, each retainer including a generally flat body having end walls generally parallel with the vertical flanges of its respective corner post; and snap lock means interposed between each of said corner posts and the main body of its respective retainer and including telescopically interfitting pins and sockets.

References Cited in the file of this patent

UNITED STATES PATENTS

| | | |
|---|---|---|
| 1,571,196 | Galant | Feb. 2, 1926 |
| 2,713,847 | Blaise | July 26, 1955 |
| 2,787,981 | Landesberg | Apr. 9, 1957 |
| 2,792,811 | Di Chiaro | May 21, 1957 |
| 2,956,705 | Clingman | Oct. 18, 1960 |
| 3,095,853 | Stout | July 2, 1961 |